(12) United States Patent
Wilson et al.

(10) Patent No.: US 7,467,136 B2
(45) Date of Patent: Dec. 16, 2008

(54) SYSTEM AND METHOD FOR PERSISTENT QUERY INFORMATION RETRIEVAL

(75) Inventors: Silvy Wilson, Rancho Santa Margari, CA (US); Alok Mathur, Foothill Ranch, CA (US); Andrey Savov, Fullerton, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 327 days.

(21) Appl. No.: 11/249,986

(22) Filed: Oct. 13, 2005

(65) Prior Publication Data

US 2007/0088685 A1    Apr. 19, 2007

(51) Int. Cl.
    *G06F 17/30* (2006.01)

(52) U.S. Cl. .................... 707/4; 707/3; 707/5

(58) Field of Classification Search ............ 707/4, 707/3, 1, 10, 100, 103, 5; 700/121, 132; 705/1, 3, 26, 27
See application file for complete search history.

(56) References Cited

U.S. PATENT DOCUMENTS

| | | | |
|---|---|---|---|
| 5,031,124 A * | 7/1991 | Bosinoff et al. ............. | 702/186 |
| 5,201,047 A * | 4/1993 | Maki et al. .................. | 707/4 |
| 6,199,062 B1 * | 3/2001 | Byrne et al. ................. | 707/3 |
| 6,681,222 B2 * | 1/2004 | Kabra et al. ................. | 707/5 |
| 7,165,065 B1 * | 1/2007 | Welton et al. ............... | 707/4 |
| 2004/0137432 A1 * | 7/2004 | Itai et al. .................... | 435/6 |

FOREIGN PATENT DOCUMENTS

WO    WO 9944158 A1 *    9/1999

* cited by examiner

*Primary Examiner*—Mohammad Ali
*Assistant Examiner*—Jerrod L Kearney
(74) *Attorney, Agent, or Firm*—Tucker Ellis & West, LLP

(57) ABSTRACT

The subject invention is directed to a system and method for submitting a series of complementary queries to a selected database in order to retrieve data associated with such queries. The method begins by receiving parameter data representing at least one parameter, which defines a plurality of entries in an associated database. Query data is then generated from the parameter data. The query data is comprised of a series of complementary queries structured to aggregate so as to correspond to all possible entries associated with the parameter data. The query data is then communicated to an associated search engine coupled to query the associated database. Result data is then received from the associated search engine. The result data is comprised of a series of responses corresponding to each of the series of complementary queries. The result data is then communicated to an associated user.

16 Claims, 2 Drawing Sheets

SYSTEM AND METHOD FOR PERSISTENT QUERY INFORMATION RETRIEVAL

BACKGROUND OF THE INVENTION

This invention is directed to a system and method for persistent query information retrieval. In particular, this invention is directed to a system and method for submitting a series of complementary queries to a selected database in order to retrieve data associated with such queries. More particularly, this invention is directed to a system and method for retrieving all requested data from an associated database wherein the query does not contain any wild card characters.

Typically, a user of a document processing system or device will desire to retrieve selected information from a database or other data storage server or device associated with the document processing system or device. For example, a user may desire to retrieve an electronic mail address of a third party in order to send an electronic document to such user. If the user does not know such party's electronic mail address, then the user must search the database for such electronic mail address. The retrieval time for such information may vary depending on the structure of the database or server containing the information or on the workload of the system. If the database or server containing the information is associated with a system or network containing many users or a heavy workload, the retrieval time may be quite slow. As such, many system administrators are under pressure to reduce the information retrieval time of such searches.

One method to decrease the information retrieval time is to configure the system such that the most frequently used server is set as the default for all information retrieval requests and all database entries are cached or stored on that server. One problem, however, is that most servers do not allow wild card searches and consequently, the user may not use wild card characters in his search. As such, one search may not retrieve the required information if the user did not know the exact electronic mail address. The user must keep entering what the user believes may be the party's correct information until the correct entry is retrieved. In addition, the system administrator may have set a limit for the number of queries a user may submit for one session. Therefore, there is a need for a system and method for information retrieval that allows for multiple queries to a database or server such that the queries are formulated to retrieve all of the relevant data.

The subject invention overcomes the above-noted limitations and provides a system and method for persistent query information retrieval.

SUMMARY OF THE INVENTION

In accordance with the present invention, there is provided a system and method for persistent query information retrieval.

Further, in accordance with the present invention, there is provided a system and method for submitting a series of complementary queries to a selected database in order to retrieve data associated with such queries.

Further, in accordance with the present invention, there is provided a system and method for retrieving all requested data from an associated database wherein the query does not contain any wild card characters.

Still further, in accordance with the present invention, there is provided persistent query information retrieval system. The system includes means adapted for receiving parameter data representative of at least one parameter defining a plurality of entries in an associated database and means adapted for generating, from the parameter data, query data comprised of a series of complementary queries structured to aggregate so as to correspond to all possible entries associated with the parameter data. The system also includes means adapted for communicating the query data to an associated search engine coupled to query the associated database. The system further includes means adapted for receiving, from the associated search engine, result data comprised of a series of responses corresponding to each of the series of complementary queries and means adapted for communicating the result data to an associated user.

Still further, in accordance with the present invention, there is provided a method for persistent query information retrieval. The method includes the steps of receiving parameter data representative of at least one parameter defining a plurality of entries in an associated database, generating, from the parameter data, query data comprised of a series of complementary queries structured to aggregate so as to correspond to all possible entries associated with the parameter data, and communicating the query data to an associated search engine coupled to query the associated database. The method also includes the steps of receiving, from the associated search engine, result data comprised of a series of responses corresponding to each of the series of complementary queries; and communicating the result data to an associated user.

Still other objects and aspects of the present invention will become readily apparent to those skilled in this art from the following description wherein there is shown and described a preferred embodiment of this invention, simply by way of illustration of one of the best modes suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

This invention is directed to a system and method for persistent query information retrieval. More particularly, this invention is directed to a system and method for submitting a series of complementary queries are submitted to a selected database in order to retrieve data associated with such queries. This invention allows multiple queries to a database or server such that the queries are formulated to retrieve all of the relevant data.

Figure 1:
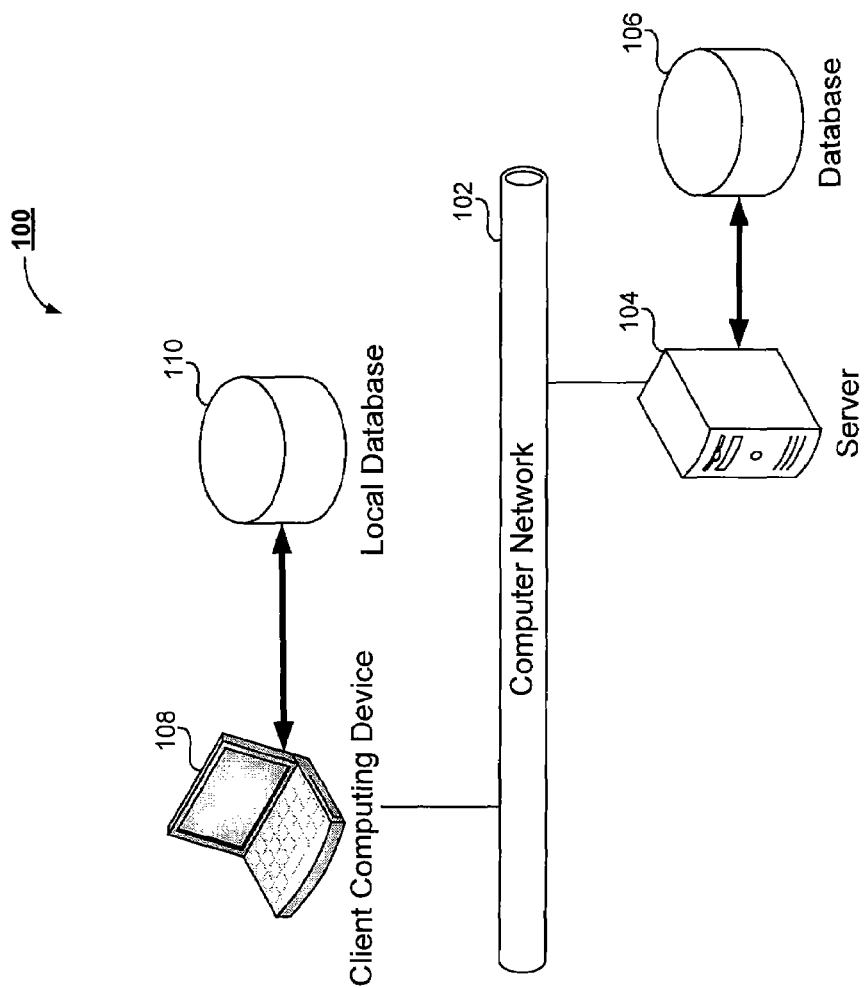
FIG. 1 is a block diagram of the system according to the present invention.

Turning now to FIG. 1, there is shown a block diagram illustrating a system 100 in accordance with the present invention. The system 100 of FIG. 1 is illustrated as incorporating hardware components representative of a client-server relationship. It will be appreciated by those skilled in the art that the use of the client device and the server are for example purposes only and the present invention is equally capable of being employed at the program level, independent of the hardware on which the programs are stored. As shown in FIG. 1, the system 100 includes a computer network 102. Those skilled in the art will appreciate that the computer network 102 is any network, known in the art, which is capable of enabling communication of data between two or more electronic devices, such as the server and the client. As the skilled artisan will understand, the present invention is capable of implementation on any such computer network, including, without limitation, Ethernet, local area network, wide area network, personal area network, Token Ring, the Internet, intranets, and the like.

The system 100 further includes a server 104 suitably adapted to directory services to one or more clients. In accordance with the preferred embodiment of the present invention, the server 104 is representative of a program that provides directory services to one or more clients. Those skilled in the art will appreciate that any such server, known in the art, is equally adaptable for use in accordance with the present invention. It will further be understood by the skilled artisan that the directory service of the present invention is advantageously a structured repository of data regarding all aspects of the network 102, including users, software, hardware, and the various rights and policies assigned to each. Preferably, the server 104 is a lightweight directory access protocol server, or LDAP server, which is in data communication with a database 106. It will be understood by those skilled in the art that lightweight directory access protocol defines a relatively simple protocol for updating and searching directories run over transmission control protocol/internet protocol, or TCP/IP.

The database 106 is preferably a directory database containing multiple directory entries. As will be appreciated by those skilled in the art, a directory entry, as used herein, is a collection of attributes with an unambiguous name associated therewith. Each entry attribute comprises a type and one or more values, which are dependent upon the type. Further in accordance with the present invention, the directory database is a lightweight directory access database, containing LDAP entries, which are arranged in a hierarchical structure that reflects political, geographic, and/or organizational boundaries. Entries representing countries appear at the top of the tree. Below them might be entries representing people, organizational units, printers, documents, and the like. For example, the database is capable of storing the location and addresses of every device, application, and the like on the network 102. In addition, the database includes an electronic mail address listing containing the electronic mail addresses of all users of the network.

The system 100 further includes one or more clients, illustrated in FIG. 1 as a portable computing device 108. It will be appreciated by those skilled in the art that the client device 108 is representative of a client program in data communication with the server 108 and the use of the device 108 is for illustration purposes only and not to limit application of the present invention solely thereto. The client 108 is communicatively coupled to a local database 110. In accordance with one embodiment of the present invention, the local database 110 is used to facilitate faster location of needed data, as opposed to requesting a search of the server 104. In order to populate the local database 110, the client requests all entries corresponding to a specific type, from the server 104. As will be understood by those skilled in the art, to overcome any restriction emplaced by an administrator preventing the complete transmittal of all entries to a client, the subject invention submits a plurality of queries and subqueries. To accomplish this search, a wild card prefix search is initiated. It will be understood by those skilled in the art that the use of wild card searching allows a user to broaden the scope of a search, capture a variety of different spellings, or endings, and the like.

When the wild card search fails to return all entries of the type specified by the user, the task is split into subquery searches, which will be explained in greater detail below. To facilitate the searching after failure of the wild card search, a complete set of characters that can possibly be on the database is generated corresponding to the type of entry, as specified by an associated user. For example, when the query is for electronic mail messages, which other than the special characters "–", "_", "+", ".", and "@", are limited to characters "a-z" and "0-9". The subquery search preferably begins with the first character in the set of characters is used. Thus, all entries in the database 106 of the selected type and beginning with the selected character are returned as a result of the search and stored on the local database 110. This process is repeated for each character of the character set until a search has been conducted using every character as the starting point of the search.

When the search fails to retrieve all entries associated with a particular character of the character set during the character search, combinations of that particular character are then searched until all entries corresponding to the specified type have been retrieved and stored locally. Thus, the present invention embodies a recursive search algorithm whereby the client continues searching until all entries associated with a given request have been retrieved and stored locally. The system 100 of the present invention will better be understood in conjunction with the flowchart 200 illustrated in FIG. 2.

Figure 2:
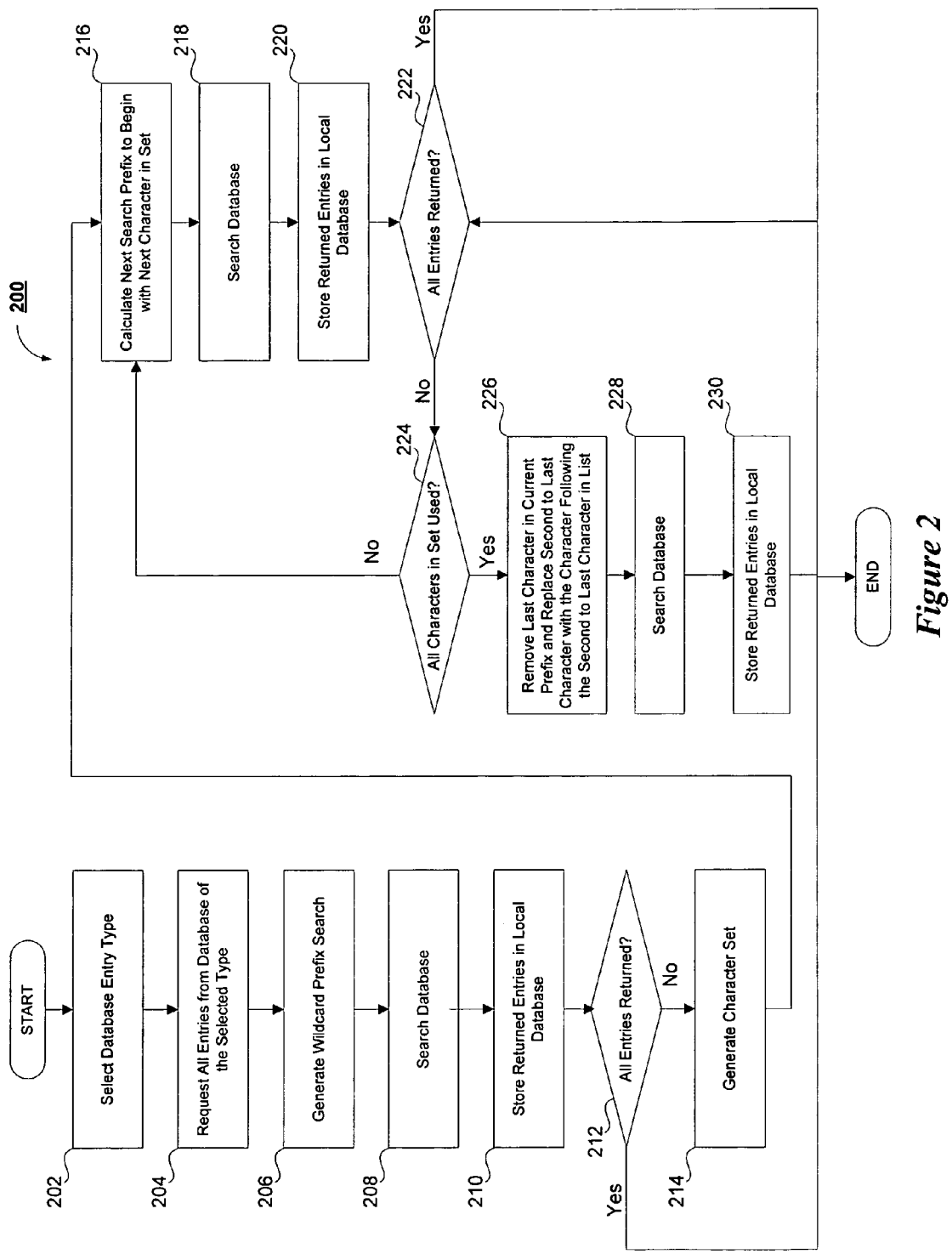
FIG. 2 is a flowchart illustrating a persistent query information retrieval method in accordance with the present invention.

Referring now to FIG. 2, there is shown a flowchart illustrating a persistent query information retrieval method in accordance with the present invention. To facilitate interpretation of the method in accordance with the subject invention, reference will be made herein to searching for electronic mail addresses stored on a lightweight directory access protocol server/database combination. The skilled artisan will appreciate, however, that the subject invention is applicable to any directory service known in the art and the instant invention is not limited solely to lightweight directory access protocol server/database embodiments. Furthermore, while the present invention refers to a single server/database, those skilled in the art will understand that the present method is capable of implementation on a system comprising multiple server/database combinations, with the client performing the following method with respect to each server, thereby retrieving all entries on the system corresponding to the user selected entry type.

The method begins at step 202, wherein a user selects, via any means known in the art, a database entry type to be retrieved and stored locally. The user, via the client 108, then requests all entries from the database 106 corresponding to the selected electronic mail address type at step 204. Upon receipt of such a request, the client generates, at step 206, a wild card prefix search for the initial attempt to retrieve all electronic mail address entries present on the database 106. It will be appreciated by those skilled in the art that the use of a wild card prefix advantageously enables a user to locate words using patterns for a set of words (replacing single or multiple characters) and to locate synonyms or word forms of a word. For example, "?" denotes the replacement of a single character in a term, while "*" is used to replace zero or more characters in a term. The wild card search is then used to search the database 106 at step 208. It will be understood by those skilled in the art that the client generates a search query, using a wild card prefix, and submits the same to the server 104. The server 104 then performs a search of the database 106 for all entries that answer the query, i.e., all electronic mail addresses having characters/terms that coincide with the broadened wild card search. The retrieved entries are then returned to the client 108 and stored, or cached, in a local database 110 at step 210.

A determination is then made at step 212 whether all entries of the type requested have been retrieved. As previously stated, LDAP servers 104 are capable of being restricted by administrators to limit the number of entries a client is allowed to receive from a single search. Thus, when such a restriction is not in place, i.e., all entries have been returned at step 212, the client has a complete local database 110 of the desired entry type and the process terminates. When all entries of the selected type have not been returned, flow proceeds to step 214, wherein a complete set of characters is generated corresponding to the type of entry selected by the user. For example, when the entry type selected is an electronic mail address, only those characters associated with electronic mail addresses are incorporated into the character set. Thus, the characters "–", "_", "+", ".", "@", "a-z", and "0-9" are the only characters included in the character set and other characters, such as "[", "]", "&", "%", and the like, will be excluded from the search.

At step 216, the next search prefix is calculated. The next search prefix begins with the next character in the generated character set. It will be understood by those skilled in the art that when the preceding search was conducted as a wild card search, the next character in the character set is in fact the first character of the set. In either event, the character is used to generate a search query, which is submitted to the server 104. The database 106 is then searched at step 218 using the next character search prefix calculated at step 216. The corresponding entries returned as a result of that search are stored in the local database 110 at step 220.

A determination is then made at step 222 whether the previous search has resulted in all entries corresponding to the selected type having been retrieved and stored in the local database 110. When the determination at step 222 is positive, the client has all entries corresponding to the selected type in the local database 110 and the operation terminates. When all entries have not yet been retrieved, flow proceeds to step 224, wherein a determination is made whether all characters in the generated character set have been used. When all characters in the character set have not yet been used, flow returns to step 216, wherein a search prefix is calculated using the next character in the character set. Operation of the search method continues as discussed above, with respect to steps 218-224.

Upon a determination at step 224 that all the characters in the character set have been used, and that the determination from step 222 indicates that not all entries have been retrieved, flow proceeds to step 226. At step 226, the last character in the current prefix is removed and the second to last character is replaced with the character that follows the second to last character in the set. The database 106 is then searched at step 228 using the newly generated prefix. For example, when a search for all entries with "b" fails, "b" being the current prefix, a search is conducted separately for all entries starting with "ba", "bb", "bc", "bd" . . . "b@". All entries returned as a result of the search are then stored locally on the local database 110 at step 230 and flow returns to step 222 for a determination whether all entries corresponding to the selected type have been returned. When all entries have been returned, the process terminates, as explained above. When all entries have not been retrieved, flow proceeds to step 224, wherein a determination is made whether all characters in the character set have been used. When all characters have not been use, flow returns to step 216 and the next search prefix is calculated. When all characters have been used, flow proceeds to step 226. Continuing with the example above, when a search for all entries with the prefix "bf" fails to result in the retrieval of all corresponding entries, a search is conducted separately for all entries beginning with "bfa", "bfb" . . . "bf@". Thus, recursive operation of the search will continue until all entries corresponding to the selected type have been retrieved and stored in the local database 110.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

While in the preferred embodiment the present invention is implemented in software, as those skilled in the art can readily appreciate it may also be implemented in hardware or a combination of software and hardware. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed:

1. A persistent query information retrieval system comprising:

means for receiving parameter data representative of string-based search query, inclusive of a trailing wildcard character, the search parameter defining a subset of a plurality of entries in an associated database and wherein the string includes characters from an associated character set;

testing means for testing a set of returned entries associated with each search parameter relative to an existence of remaining entries;

means or generating a plurality of nested search parameters corresponding to each search parameter defined by the testing means to have remaining entries by automatically and sequentially applying each of a set of text characters from the character set in a position of the trailing wildcard character while shifting the wildcard character one position to the right in the string-based search query;

means for generating, from the parameter data, query data comprised of a series of complementary queries structured to aggregate so as to correspond to all possible entries associated with the parameter data;

means for communicating the query data to an associated search engine coupled to query the associated database;

means for receiving, from the associated search engine, result data comprised of a series of responses corresponding to each of the series of complementary queries; and means for communicating the result data to an associated user in accordance with received result data.

2. The persistent query information retrieval system of claim 1 wherein the parameter data includes at least one of a wild card character applicable to a plurality of characters in a search.

3. The persistent query information retrieval system of claim 2 wherein the parameter data further includes at least one character string applicable to a plurality of characters strings in a search.

4. The persistent query information retrieval system of claim 3 wherein the parameter data further includes at least one truncation string applicable to a latter portion of plurality of ending characters strings in a search.

5. The persistent query information retrieval system of claim 1 wherein the search engine is comprised of an LDAP search engine.

6. The persistent query information retrieval system of claim 1 wherein query data is communicated to the associated search engine a number of times equal to a number in the series of complementary queries.

7. A method for persistent query information retrieval comprising the steps of:

receiving parameter data representative of string-based search query, inclusive of a trailing wildcard character, the search parameter defining a subset of a plurality of entries in an associated database and wherein the string includes characters from an associated character set;

testing a set of returned entries associated with each search parameter relative to an existence of remaining entries;

generating a plurality of alternative search parameters corresponding to each search parameter determined by the testing step to have remaining entries by automatically and sequentially applying each of a set of text characters from the character set in a position of the trailing wildcard character while shifting the wildcard character one position to the right in the string-based search query;

generating, from the parameter data, query data comprised of a series of complementary queries structured to aggregate so as to correspond to all possible entries associated with the parameter data;

communicating the query data to an associated search engine coupled to query the associated database;

receiving, from the associated search engine, result data comprised of a series of responses corresponding to each of the series of complementary queries; and communicating the result data to an associated user in accordance with received result data.

8. The method for persistent query information retrieval of claim 7 wherein the parameter data includes at least one of a wild card character applicable to a plurality of characters in a search.

9. The method for persistent query information retrieval of claim 8 wherein the parameter data further includes at least one character string applicable to a plurality of characters strings in a search.

10. The method for persistent query information retrieval system of claim 9 wherein the parameter data further includes at least one truncation string applicable to a latter portion of plurality of ending characters strings in a search.

11. The method for persistent query information retrieval system of claim 7 wherein the search engine is comprised of an LDAP search engine.

12. The method for persistent query information retrieval system of claim 7 wherein query data is communicated to the associated search engine a number of times equal to a number in the series of complementary queries.

13. A computer-implemented method for persistent query information retrieval comprising the steps of:

receiving parameter data representative of a string-based search query, inclusive of a trailing wildcard character, the search parameter defining a subset of a plurality of entries in an associated database and wherein the string characters include characters from an associated character set;

testing a set of returned entries associated with each search parameter relative to an existence of remaining entries;

generating a plurality of alternative search parameters corresponding to each search parameter determined by the testing step to have remaining entries by automatically and sequentially applying each of a set of text characters from the character set in a position of the trailing wildcard character while shifting the wildcard character one position to the right in the string-based search query;

generating, from the parameter data, query data comprised of a series of complementary queries structured to aggregate so as to correspond to all possible entries associated with the parameter data;

communicating the query data to an associated search engine coupled to query the associated database;

receiving, from the associated search engine, result data comprised of a series of responses corresponding to each of the series of complementary queries; and communicating the result data to an associated user in accordance with received result data.

14. The computer-implemented method for persistent query information retrieval of claim 13 wherein the parameter data includes at least one of a wild card character applicable to a plurality of characters in a search.

15. The computer-implemented method for persistent query information retrieval of claim 14 wherein the parameter data further includes at least one character string applicable to a plurality of characters strings in a search.

16. The computer-implemented method for persistent query information retrieval system of claim 15 wherein the parameter data further includes at least one truncation string applicable to a latter portion of plurality of ending characters strings in a search.

* * * * *